United States Patent [19]

Hakala

[11] Patent Number: 5,278,484
[45] Date of Patent: Jan. 11, 1994

[54] PROCEDURE AND APPARATUS FOR BRAKING A SQUIRREL-CAGE ELEVATOR MOTOR FED BY A FREQUENCY CONVERTER IN FAULT SITUATIONS

[76] Inventor: Harri Hakala, Paivalankatu 15 A2, SF-05830 Hyvinaa, Finland

[21] Appl. No.: 665,522

[22] Filed: Mar. 7, 1991

[30] Foreign Application Priority Data

Mar. 13, 1990 [FI] Finland .................. 901249

[51] Int. Cl.$^5$ .................. H02P 3/18; H02P 5/28; B66B 1/30
[52] U.S. Cl. .................. 318/760; 318/807; 187/119; 187/114
[58] Field of Search .................. 318/800, 801, 803-811; 727, 700, 703, 757, 759, 760; 187/114, 105, 106, 119

[56] References Cited

U.S. PATENT DOCUMENTS

| 3,376,485 | 4/1968 | Shibata et al. |
| 3,708,734 | 1/1973 | Rowe. |
| 3,866,097 | 2/1975 | Anzai et al. |
| 4,083,431 | 4/1978 | Oohira et al. .................. 187/119 |
| 4,263,987 | 4/1981 | Satoh et al. .................. 187/105 |
| 4,417,191 | 11/1983 | Schmidt. |
| 4,503,376 | 3/1985 | Okuyama .................. 318/802 |
| 4,519,479 | 5/1985 | Tanahashi .................. 187/105 |
| 4,544,873 | 10/1985 | Salihi et al. .................. 318/811 |
| 4,662,478 | 5/1987 | Uchino .................. 187/114 |
| 4,667,776 | 5/1987 | Nomura .................. 318/759 |
| 4,677,361 | 6/1987 | Yonemoto .................. 318/805 |
| 4,719,995 | 1/1988 | Ikejima .................. 318/806 |
| 4,742,892 | 5/1988 | Iwata .................. 187/119 |
| 4,857,818 | 8/1989 | Hobbs .................. 318/760 |
| 4,876,637 | 10/1989 | Mose et al. .................. 318/802 |
| 4,908,563 | 3/1990 | Suur-Askola .................. 318/760 |

Primary Examiner—William M. Shoop, Jr.
Assistant Examiner—John W. Cabeca

[57] ABSTRACT

A procedure and apparatus are provided for braking a squirrelcage elevator motor fed by a frequency convertor in fault situations using a direct current supplied from a d.c. voltage source. In the procedure of the invention, the current in at least one of the motor phases and the rotational speed of the motor are measured. When the elevator speed exceeds the value corresponding to the nominal slip and the motor current is less than the nominal magnetizing current, a switching device is caused to connect a direct current from a d.c. voltage source to the motor, thereby providing a magnetizing current and allowing the motor to act as an eddy current brake.

7 Claims, 1 Drawing Sheet

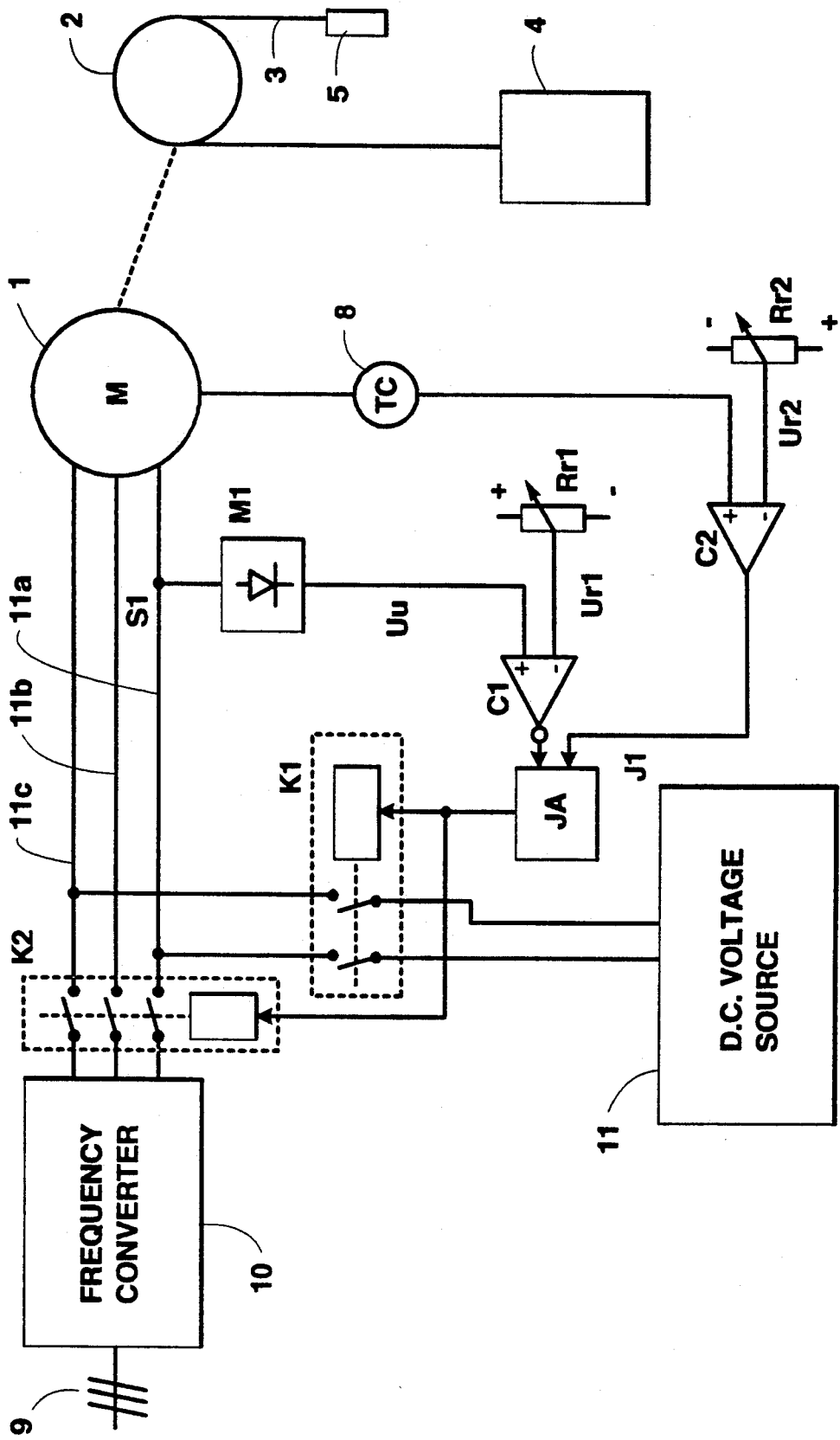

PROCEDURE AND APPARATUS FOR BRAKING A SQUIRREL-CAGE ELEVATOR MOTOR FED BY A FREQUENCY CONVERTER IN FAULT SITUATIONS

BACKGROUND OF THE INVENTION

The present invention relates to a procedure and an apparatus for braking a squirrel-cage elevator motor fed by a frequency converter in fault situations.

In certain countries, the elevator regulations stipulate that gearless elevators should be capable of so-called "dynamic braking", which means that it must be possible even in exceptional situations to decelerate the elevator by means of its motor. For instance, in the event of failure of the brake arms the motor must be able to reduce the speed of the elevator car.

In the d.c. (direct current) drives currently used, this problem has been solved by connecting a resistor to the armature winding in failure situations, thus enabling the motor to brake by acting as a generator. The regulations generally assume that the main circuit is inoperative or inaccessible, thereby preventing normal motor action. In the case of an elevator equipped with a squirrel-cage motor, a corresponding procedure cannot be applied because without its main circuit the motor will not be magnetized, and therefore cannot generate a torque.

SUMMARY OF THE INVENTION

It is therefore an object of the invention to provide a procedure for braking a squirrel-cage elevator motor fed by a frequency convertor in fault situations.

It is another object of the invention to provide an apparatus for carrying out the procedure of the invention.

It is yet another object of the invention that the apparatus be simple, inexpensive and reliable.

According to the present invention, dynamic braking of a frequency converter-fed gearless elevator motor is achieved by connecting a d.c. voltage source, such as a battery, directly to the motor windings. This enables the motor to act as an eddy-current brake, reducing the car speed to an acceptable value.

The procedure of the invention is characterised as using a direct current supplied from a d.c. voltage source and controlled by means of a switching device. The procedure comprises the steps of:

measuring the rotational speed of said motor, and the phase current in at least one of the motor phases; and connecting said direct current from said d.c. voltage source to said motor by means of said switching device when the rotational speed of said motor exceeds a value corresponding to the nominal slip and the phase current of said motor is less than the nominal magnetizing current.

The apparatus of the invention is characterised as comprising:

a first switching device for controlling the supply of direct current to said motor;

at least one current sensing element for measuring the phase current of said motor;

at least one processing device responsive to said current sensing element, for producing a voltage proportional to the phase current of said motor;

a device measuring the rotational speed of said motor and providing a voltage corresponding to the rotational speed thereof;

at least one first comparator circuit, which compares said voltage proportional to the phase current to a reference value corresponding to the nominal magnetizing current of said motor;

a second comparator circuit, which compares the voltage corresponding to the rotational speed of said motor to a reference value corresponding to the nominal slip of said motor; and a control unit which causes said first switching device to connect a direct current from said d.c. voltage source to said motor, when the elevator speed exceeds the value corresponding to the nominal slip and the motor current is less than the nominal magnetizing current.

The invention provides the following advantages:

The invention is simple and inexpensive to implement because the battery is an advantageous means of producing a large current. For instance an automobile starting battery can deliver a current of several hundreds of amperes. Moreover, because the battery is not used continuously, it is possible to use an inexpensive starter-type battery. Furthermore, an elevator is typically provided with batteries (e.g. to feed emergency lighting devices etc.), thus the maintenance of the breaking batteries will involve little extra maintenance work.

Moreover, batteries are fully operable without a mains supply. A d.c. motor needs at least a magnetising current.

Using the apparatus of the invention does not require any changes to the frequency converter itself, so the apparatus can easily be added to an existing elevator system if necessary.

Since the battery is not used continuously, a charger with a very low current rating may be used, thus lowering the cost of the charger unit. It is also possible to omit the charger altogether provided that the battery is regularly replaced, e.g. in conjunction with regular maintenance operations. The battery can be recharged at a convenient service location and replaced during the next servicing operation.

BRIEF DESCRIPTION OF THE DRAWINGS

In the following, the invention is described in detail by the aid of an example by referring to the attached drawing, which illustrates schematically the apparatus of the invention for dynamic braking of an elevator.

DESCRIPTION OF THE PREFERRED EMBODIMENT

The elevator has a three-phase squirrel-cage motor (M) 1, which rotates a traction sheave 2. By means of a lifting rope 3, the traction sheave 2 transmits the motion to the elevator car 4 and counterweight 5 suspended at the ends of the rope 3. The motor speed is measured by means of a tachometer generator (TC) 8. The motor 1 is fed via a frequency convertor 10 connected to a three-phase mains network 9. For the detection of fault situations, The phase current and rotation speed of the motor 1 are detected.

A current sensor S1, connected to one of the motor supply conductors 11a–11c, measures the phase current of the motor 1. Three-phase measurement can also be used. The signal from the sensor S1 is applied to a signal processing device M1, which rectifies and filters the signal so as to produce a d.c. voltage Um proportional to the motor current. The voltage Um is passed to a comparator C1, whose other input is fed by a reference voltage Ur1 obtained from a variable resistor Rr1. The reference voltage is selected such that, if the motor current exceeds the nominal magnetizing current, the inverted output of comparator C1 will be in the "0"-state. Otherwise, the inverted comparator output will be "1".

The tachometer 8 produces a voltage Uv which is proportional to the rotational speed of the motor 1. The voltage Uv is fed into comparator C2. The other input of the comparator C2 is provided with the reference voltage Ur2, obtained from variable resistor Rr2, which is selected such that it approximately corresponds to the value of the nominal slip of the motor. Therefore the output from comparator C2 will be "1" when the voltage Uv (corresponding to the rotational speed of the motor) exceeds that of the reference value Ur2 (corresponding to the nominal slip of the motor).

The signals from the two comparators C1 and C2 are applied to the inputs of an "AND" circuit J1, whose output state is "1" if the elevator speed exceeds the value corresponding to the nominal slip (about 7-15% of the maximum speed) and no nominal magnetizing current is flowing in the motor.

If the output of "AND" circuit J1 is "1", this is regarded as a fault situation and contactor K1 of a d.c. voltage source 11, such as a battery, is closed, causing the d.c. voltage source 11 to be connected to the motor supply conductors 11a–11c. Note that one of the d.c. voltage source terminals is connected to one conductor while the other terminal is connected to the other two conductors. With this arrangement the d.c. voltage source 11 provides a magnetizing current to the motor 1, thereby enabling the motor 1 to generate torque. When the d.c. voltage source 11 is connected to the motor supply conductors 11a–11c, the normal power supply from the frequency convertor 10 must be simultaneously disconnected, by means of a second contactor K2, to avoid damage.

The voltage level of the d.c. source 11 must be selected such that the direct current supplied by the d.c. source 11 is approximately equal to the nominal motor current. In this case the elevator speed will be limited to the value corresponding to the nominal slip of the motor 1 if the car 4 is empty or carrying a nominal load. Otherwise the speed will be lower. After the fault has been detected, the d.c. source 11 will remain connected until the car 4 or the counterweight 5 reaches the buffer (not shown). If the braking reduces the elevator speed below the value determined by the reference value Ur2, the d.c. source 11 will be disconnected and the elevator will continue falling, but there is no harm in this because the d.c. source will be reconnected as the speed increases.

Since the direct current supplied by the d.c. source 11 is of a magnitude equal to the nominal current of the motor 1, the motor losses are also close to the nominal values. This means that the motor temperature will not rise above the normal level.

It will be apparent to a person skilled in the art that different embodiments of the invention are not restricted to the example described above, but that they may instead be varied within the scope of the following claims.

The embodiments of the invention in which an exclusive property or privilege is claimed are as follows:

1. A procedure for braking a squirrel-cage elevator motor in fault situations, said elevator motor being normally fed by a frequency convertor, said procedure being independent of a normal control operation of the motor and comprising the steps of:

measuring the rotational speed of said motor, and comparing the measured rotational speed to a nominal slip of said motor;

measuring a phase current in at least one of the motor phases and comparing said measured phase current to a nominal magnetizing phase current;

generating a fault signal when the measured rotational speed of said motor exceeds the nominal slip of said motor and the measured phase current of said motor is less than the nominal magnetizing phase current of said motor; and disconnecting said frequency convertor from said motor, and simultaneously supplying a direct current from an independent D.C. voltage source to said motor, in response to said fault signal.

2. A procedure as claimed in claim 1, wherein the phase current of said motor is measured by means of a current sensing element adapted to provide a current signal used to produce a voltage proportional to the phase current, and wherein said voltage is compared, in a first comparator circuit, to a reference value corresponding to the nominal magnetizing current of said motor.

3. A procedure as claimed in claim 1, wherein the rotational speed of the motor is measured by means of a device which provides a voltage proportional to the rotational speed of the motor, and wherein the voltage is compared, in a second comparator circuit, to a reference voltage corresponding to a nominal motor slip.

4. A procedure as claimed in claim 1, wherein said d.c. voltage source comprises at least one battery.

5. An apparatus for braking a squirrel-cage elevator motor in fault situations, said elevator motor being normally fed by a frequency convertor, said apparatus being independent of a control system for normal operation of the motor and comprising:

a first switching device for controlling the supply of direct current to said motor;

at least one current sensing element for measuring a respective phase current of said motor;

at least one processing device responsive to said current sensing element, for producing a voltage proportional to the phase current of said motor;

a device for measuring the rotational speed of said motor and providing a voltage corresponding to the rotational speed thereof;

at least one first comparator circuit, which compares said voltage proportional to the phase current to a reference value corresponding to a nominal magnetizing current of said motor;

a second comparator circuit, which compares the voltage corresponding to the rotational speed of said motor to a reference value corresponding to a nominal slip of said motor; and a control unit which causes said first switching device to connect a direct current from an independent d.c. voltage source to said motor, when the elevator speed exceeds the value corresponding to the nominal slip and the motor current is less than the nominal magnetizing current.

6. An apparatus as claimed in claim 5, further comprising a second switching device disposed between said frequency converter and said motor, wherein said second switching device disconnects said frequency converter from said motor in response to a signal produced by said control unit, said control unit causing both of said first and second switching devices to operate simultaneously.

7. An apparatus as claimed in claim 5 wherein said d.c. voltage source comprises at least one battery.

* * * * *

UNITED STATES PATENT AND TRADEMARK OFFICE
CERTIFICATE OF CORRECTION

PATENT NO. : 5,278,484
DATED : January 11, 1994
INVENTOR(S) : Harri HAKALA It is certified that error appears in the above-identified patent and that said Letters Patent is hereby corrected as shown below:

On the title page, between "[76] Inventor" and

"[21] Appl. No.", insert:

--[73] Assignee: Kone Elevator GmbH

Baar, Switzerland--

Signed and Sealed this

Twenty-fourth Day of May, 1994

*Attest:*

BRUCE LEHMAN

*Attesting Officer*     Commissioner of Patents and Trademarks